Nov. 6, 1951 — I. M. DAVIDSON — 2,573,834
DUCT INTAKE OR ENTRY FOR GASEOUS FLUID FLOW DIFFUSER SYSTEM
Filed March 24, 1948
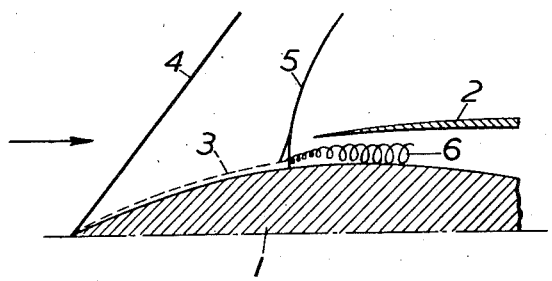
Fig. 1
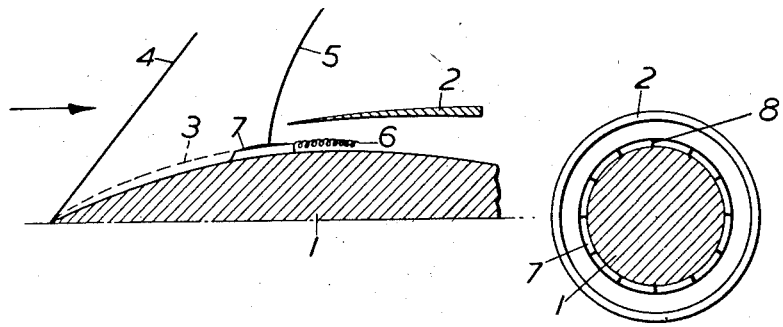
Fig. 2    Fig. 3
Fig. 4
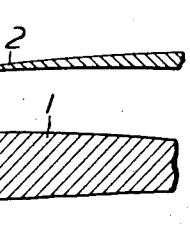
Inventor
Ivor Macauley Davidson
By Stevens Davis & Miller
his Attorneys

Patented Nov. 6, 1951

2,573,834

UNITED STATES PATENT OFFICE

2,573,834

DUCT INTAKE OR ENTRY FOR GASEOUS FLUID FLOW DIFFUSER SYSTEM

Ivor Macaulay Davidson, South Farnborough, England, assignor to Power Jets (Research and Development) Limited, London, England, a British company Application March 24, 1948, Serial No. 16,858
In Great Britain April 22, 1947

5 Claims. (Cl. 244—53)

This invention relates to duct intakes or entries for gaseous fluid flow diffuser systems which operate in supersonic velocity conditions by which is meant in this specification and the appended claims, intakes which are in the region of or are affected by conditions associated with a "shock wave" represented by a large and more or less instantaneous change of pressure at the junction of contiguous zones of flow at either side of which the flow velocities are more or less instantaneously changed in such a fashion that the velocity components upstream and downstream of and normal to the shock, and determined under the local conditions, are respectively supersonic and subsonic; or, in other words, that the component Mach numbers at the points in question are respectively greater and less than unity, the Mach number being the ratio of the velocity of the fluid at a given point to the velocity of sound at that point relative to the fluid.

The invention is concerned with such intakes of the kind in which it is required that at least a part of the boundary surface of the intake extends upstream therefrom, so that problems associated with the existence of a boundary layer arise.

The invention has application both to the case in which the relative velocity is derived from actual flow of the gaseous fluid, and that in which the relative velocity arises from movement of the intake in the fluid; and also both to the case in which the approach relative velocity as well as the intake velocity or component velocity is supersonic, and that in which the approach relative velocity is subsonic whilst the velocity or component velocity in a zone affecting conditions at the intake is supersonic, it being the velocity at the intake or in a zone affecting conditions there that is the material factor from the point of view of the invention. The invention further has application to the case in which the diffusion takes place from one supersonic velocity to a lower supersonic velocity, provided that shock waves occur.

It has been found that the formation of a shock wave at or in the region of an intake, of the kind referred to is a serious factor in the efficiency of the intake the losses in which may be divided into two main groups, namely:

(1)

a. Head compression shock loss (where the upstream-extending boundary surface has an end deflecting a supersonic fluid stream).

b. Intake compression shock loss.

c. Frictional drag on the upstream-extending boundary surface.

d. Usual subsonic diffuser losses (i. e. assuming no losses due to secondary effects caused by intake compression shock).

(2)

e. Separation loss caused directly by interaction between the intake shock and the boundary layer of the upstream extending surface.

f. The increased diffuser losses caused indirectly by e above.

It has been found that the losses in groups (1) and (2) are of the same order—the group (2) loss may, in fact, be the greater of the two—but, whereas some loss under group (1) is inherent and must therefore be accepted, that due to group (2) could be completely eliminated if only some means could be found for avoiding boundary layer separation downstream of the intake shock. It is an object of the present invention to mitigate losses of the group (2) variety.

The invention is based on the conception of segregating the boundary layer of the upstream-extending surface from the main fluid flow in the zone of the intake compression shock so that there can be no interaction between the two, the boundary layer and the main flow being reunited downstream of the shock. For this purpose it is proposed to provide in said shock zone a partition element adjacent to and spaced from the upstream-extending surface so as to form with said surface a passage or slot having a forwardly facing entry which will receive boundary layer fluid whilst fluid of the main flow will pass on the other side of the partition.

The partition, which in general should be approximately or actually parallel with the upstream extending surface, should be thin and of such length in the direction of flow as to be effective for a range of positions of the intake shock wave if the location of the latter is liable to variation with changing conditions. The actual length in any particular case will depend upon the extent of such variation to be expected, but should be as short as practicable consistent with this factor and will normally be about three times the intake depth.

In general, the invention is that the spacing of the partition from the upstream extending surface, ideally, should be such as to afford a passage or slot of just sufficient depth to accept the whole of the boundary layer but not that of the main flow. The depthwise dimension is not, however, considered to be highly critical and departure from the ideal is permissible, but there should preferably always be some flow of supersonic velocity in the slot in order to avoid choking. The term "boundary layer" does not, of course, represent an exact conception, but for the purpose of the invention will be regarded as the region in which, at successive points in a direction normal to the surface being considered, there is an appreciable change in the relative velocity of the flow due to viscous drag on the surface; to those skilled in the art a common measure of the extent of this region is that defining it as the 99% displacement thickness.

The invention will be shown by referring to the drawings in which:

Fig. 1 is a sectional view of a side elevation showing the problem the invention is designed to meet;

Fig. 2 is a sectional view of a side elevation of the invention;

Fig. 3 is a front elevation, partly in section, showing the invention;

Fig. 4 is a sectional view of a side elevation of the invention.

The problem which the invention is designed to meet is illustrated in Figure 1 as it arises in the particular case of an aircraft air intake of annular form surrounding a forwardly projecting nacelle. In the figure, 1 is the nacelle, 2 a fuselage wall forming with the nacelle an annular intake and diffusion duct, and 3 the boundary layer on the nacelle surface, whilst the arrow indicates the relative direction of air flow. Under supersonic conditions there will be a head compression shock wave such as indicated by the line 4 at the nose of the nacelle, and an intake compression shock wave such as indicated at 5. If no steps are taken to avoid it, the shock 5 will cause a separation of the boundary layer on its downstream side as indicated at 6, with consequent severe losses. The application of the invention to this case is illustrated in Figures 2, 3 and 4, in which the boundary layer air is segregated from the main flow in the zone of the intake shock 5 by the use of a thin ring 7 concentric with the nacelle 1 and spaced therefrom, on the basis previously explained, so as to accept the boundary layer air, the ring in this case having an axial length about three times the intake depth and extending somewhat into the intake so as to provide for the expected range of positions of the intake shock. The ring may be supported in a variety of ways, as for example by internal webs 8 as illustrated.

With the use of the invention the intake compression shock 5 can interact only with the small boundary layer on the outer surface of the partition element. Due to supersonic flow within the slot a shock wave system will be set up therein also, but this shock system will be of a minor nature in its effect on the main flow since it will be confined by the slot walls and is in fact a desirable phenomenon in the practice of the invention, since the existence of supersonic flow within the slot will tend to avoid choking of the flow which would be a danger if the flow therein were only slightly subsonic. Choking could also be avoided by ensuring that the flow in the slot is emphatically subsonic, but in this case not enough of the boundary layer would be segregated to enable the object of the invention to be achieved. In the result, it should be possible for almost all the aforementioned group (2) loss to be eliminated, at the expense of substituting a smaller loss.

A secondary advantage to be expected of an intake according to the invention is that when the mass flow is restricted by some form of throttling, as of a power unit fed by the intake, the phenomenon of surging, if not eliminated, should at least be delayed. That is, the working range of an intake as well as its efficiency should be enhanced by the use of the invention.

The invention has particular value in the solution of the problems, stated in general terms in the foregoing, as they arise in air intakes for high speed aircraft or other bodies intended for high speed flight, and in particular, although not exclusively, in air intakes for supplying working air to gas turbine aero engines or other continuous combustion propulsion units requiring a comparably high mass flow of air. The reason for this is that at high speeds the design of air intakes for such units becomes of great importance due primarily to the fact that the ram effect becomes an increasingly larger factor in the compression portion of the thermodynamic cycle so that the conversion from dynamic to pressure energy must be achieved with the highest possible efficiency.

I claim:

1. In a gaseous fluid flow diffuser system designed to operate in conditions in which a shock wave substantially normal to the flow is formed in the course of the flow's entering the system, a conduit having an intake opening positioned to face the oncoming flow, a wall extending a substantial distance upstream from a portion of the perimeter of said opening and including a boundary surface in contact with the fluid flow on which surface a boundary layer of fluid is formed, partition means defining with said surface a fluid bleed aperture positioned to face the oncoming flow, said bleed aperture being of substantially smaller cross sectional area than said intake opening and constituting substantially a bleed for said boundary layer of fluid as distinguished from fluid of the main flow, said bleed aperture being located in the region of, but upstream from the intake opening and forming the entry to a passage which debouches into the main stream at a point downstream of the intake opening, and being effective to operate as a boundary layer bleed at the highest flow velocities for which the intake is designed, said partition means being a fixed element distinct from said upstream extending wall and arranged adjacent to and spaced from said boundary surface.

2. A gaseous fluid flow diffuser system as claimed in claim 1, wherein said fixed element forms with the upstream extending wall an approximately parallel sided passage.

3. A gaseous fluid flow diffuser system as claimed in claim 1, wherein at least a major part of said fixed element lies upstream of the intake opening.

4. A gaseous fluid flow diffuser system as set forth in claim 1, wherein that portion of the conduit located at the intake opening is an annulus, the inner wall of which is said upstream extending wall, said fixed element being a ring concentric with said inner wall.

5. A gaseous fluid flow diffuser system as set forth in claim 1, wherein that portion of the conduit located at the intake opening is an annulus, one wall of which is said upstream extending wall, said fixed element being a ring concentric with said upstream extending wall.

IVOR MACAULAY DAVIDSON.

REFERENCES CITED

The following references are of record in the file of this patent:

UNITED STATES PATENTS

| Number | Name | Date |
|---|---|---|
| 2,334,070 | Conley | Nov. 9, 1943 |
| 2,396,598 | Reumann et al. | Nov. 12, 1946 |

FOREIGN PATENTS

| Number | Country | Date |
|---|---|---|
| 579,758 | Great Britain | Aug. 14, 1941 |